United States Patent
Lee et al.

(10) Patent No.: US 9,981,856 B2
(45) Date of Patent: May 29, 2018

(54) METHOD OF PREPARING TITANIUM CARBONITRIDE POWDER

(71) Applicant: NANO TECH Co., Ltd., Cheonju-si (KR)

(72) Inventors: Hyun Ho Lee, Cheongju-si (KR); Ki Hong Kim, Cheongju-si (KR); Su Jeong Shin, Cheongju-si (KR); Sang Myun Kim, Seoul (KR)

(73) Assignee: NANO TECH Co., Ltd., Cheongju-si (KR)

( * ) Notice: Subject to any disclaimer, the term of this patent is extended or adjusted under 35 U.S.C. 154(b) by 0 days. days.

(21) Appl. No.: 15/510,050

(22) PCT Filed: Apr. 2, 2015

(86) PCT No.: PCT/KR2015/003319
§ 371 (c)(1),
(2) Date: Mar. 9, 2017

(87) PCT Pub. No.: WO2016/024689
PCT Pub. Date: Feb. 18, 2016

(65) Prior Publication Data
US 2017/0267541 A1 Sep. 21, 2017

(30) Foreign Application Priority Data
Aug. 13, 2014 (KR) .................. 10-2014-0104899

(51) Int. Cl.
*C01G 23/00* (2006.01)

(52) U.S. Cl.
CPC ........ *C01G 23/002* (2013.01); *C01P 2004/61* (2013.01); *C01P 2004/62* (2013.01); *C01P 2004/64* (2013.01); *C01P 2006/37* (2013.01)

(58) Field of Classification Search
None
See application file for complete search history.

(56) References Cited

U.S. PATENT DOCUMENTS 5,417,952 A * 5/1995 Koc .................. B82Y 30/00
423/380

FOREIGN PATENT DOCUMENTS

JP        2013-199402 A        10/2013
KR   10-2010-0113092 A        10/2010

OTHER PUBLICATIONS

D. V. Bavbande et al., "Studies on the Kinetics of Synthesis of TiC by Calciothermic Reduction of TiO2 in Presence of Carbon" Journal of Thermal Analysis and Calorimetry, (2004) vol. 78, pp. 775-780; 6pgs.

(Continued)

*Primary Examiner* — Guinever S Gregorio
(74) *Attorney, Agent, or Firm* — Maier & Maier, PLLC (57) ABSTRACT

Disclosed herein is a method for preparing ultrafine titanium carbonitride powder under a relatively low temperature condition that obviates a grinding process. This method includes the steps of: a mixing step for contacting titanium dioxide (TiO2), calcium (Ca) and carbon (C) under an inert atmosphere, a synthesis step for reacting the resultant mixture by heating at a temperature of about 600-1500° C. or lower under a nitrogen atmosphere; and a washing step for removing calcium oxide by washing this mixture.

10 Claims, 5 Drawing Sheets

(56) References Cited

OTHER PUBLICATIONS

Dong-Won Lee et al.. "Nanosized TiC and TiCN Powders Prepared by Magensiothermic Reduction" Journal of Nano Research (2013) vol. 23, pp. 1-6; 7pgs.
International Search Report dated Jul. 2, 2015 in corresponding PCT/KR2015/003319; 4pgs.
KR Office Action dated Mar. 10, 2016 in corresponding KR 10-2014-0104899; 12 pgs.

* cited by examiner

METHOD OF PREPARING TITANIUM CARBONITRIDE POWDER

FIELD OF THE INVENTION

The present invention relates to a method for preparing ultrafine powder of titanium carbonitride. More particularly, the present invention relates to a method of preparing spheroidized ultrafine titanium carbonitride powder through metallic thermoreduction.

BACKGROUND

Composite material obtained from combining transition metal carbides and metal binders are widely used as raw material for cutting tools. Among the many subdivisions of such composite material, the main classes for cutting tools applications are tungsten carbide (WC—Co carbide) composites and titanium carbonitride (Ti(C,N) or TiCN) based cermets that have high toughness and good hardness.

Titanium carbonitride (Ti(C,N) or TiCN) is a solid solution of titanium nitride (TiN) and titanium carbide (TiC). As it comprises both constituents, titanium carbonitride enjoys both the high hardness of titanium carbide as well as excellent chemical stability and toughness of titanium nitride. Furthermore, it has superior resistance to oxidation and conductivity for heat and electricity and shows favorable resistance to creep and abrasion. Such qualities impart superior physical properties to cutting tools based on titanium carbonitride over those based on tungsten carbide.

Accordingly, titanium carbonitride powders find increasing use for cutting materials despite their high cost, the representative applications being cutting tools for manufacturing products and semi-finished products of steel and cast iron that require higher cutting speed than tungsten carbide tools.

Prior art methods for preparing titanium carbonitride powders were carried out in two stages in which powdered titanium carbide was first obtained followed by heating under a high pressure nitrogen atmosphere for extended periods at high temperatures to synthesize titanium carbonitride. Preparation of fine particles of titanium carbonitride in this way, however, was very difficult since the high temperature conditions caused abrupt growth of titanium carbide particles before their reaction with nitrogen.

On the other hand, mechanical properties required in cutting tools tend to improve as titanium carbonitride powder becomes finer and its purity higher. Accordingly, prior art methods relied on subjecting the synthesized titanium carbonitride powder to grinding, e.g., ball milling, to obtain fine particles less than a few micrometers wide. This was disadvantaged by long periods required for grinding due to the high hardness of titanium carbonitride.

For instance, a prior art reference on preparing a ultrafine TiCN matrix cermet (Zhang et al., *Rare Metals*, vol. 29 (2010), issue 5, p 528, *Preparation and properties of ultrafine TiCN matrix cermets by vacuum microwave sintering*) teaches obtaining an ultrafine powder less than 1 μm wide by grinding commercially available powdered titanium carbonitride of an average particle size of 2.2 μm for 50 hours followed by microwave sintering under vacuum. The reference reports that such vacuum microwave sintering yields a TiCN cermet whose particles were finer, harder and denser than those obtainable from simple vacuum sintering.

At present, commercially available powdered titanium carbonitride has an average particle size of about 1-3 μm. There is a strong demand in the field for ultrafine grades of titanium carbonitride, i.e. grades finer than the currently available ones ranging from a few tens of to a few hundred nanometers. However, as mentioned above, the field still lacks a method for preparing ultrafine powdered titanium carbonitride that obviates the postsynthetic additional processing steps such as grinding and heat treatment. Accordingly, there is an unmet need in the field to develop an economical method for this purpose.

OBJECTS OF THE INVENTION

It is an object of the present invention to provide a method for preparing titanium carbonitride at relatively low temperatures.

It is another object of the present invention to provide an economical method for preparing titanium carbonitride with ease in a large scale using simple processes.

It is still another object of the present invention to provide a method for preparing titanium carbonitride in an ultrafine form.

SUMMARY OF THE INVENTION

In order to achieve the above-mentioned objects, the present invention provides a method for preparing titanium carbonitride powder, the method comprising the steps of: a mixing step for contacting titanium dioxide ($TiO_2$), calcium (Ca) and carbon (C) under an inert atmosphere; a synthesis step for reacting the resultant mixture from the mixing step by heating under a nitrogen atmosphere at a temperature of about 600-1500° C. or lower; and a washing step for removing calcium oxide (CaO) by washing the mixture with water after the completion of the synthesis step. In the synthesis step of the inventive method, titanium dioxide, the starting material, undergoes carburization and nitrification simultaneously to form titanium carbonitride. In the washing step of the inventive method, calcium oxide is removed from the reaction products by dissolution into water.

In an embodiment of the present invention, titanium dioxide and calcium in the mixing step are mixed at a ratio of from more than about 2 moles to about 6 moles or less of calcium per each mole of titanium dioxide. In another embodiment of the present invention, titanium dioxide and carbon in the mixing step are mixed at a ratio of from about 0.2 moles to about 2.5 moles of carbon per each mole of titanium dioxide.

According to yet another embodiment of the invention, the mixing step can be conducted as a dry mixing.

In a specific embodiment of the present invention, the synthesis step can be carried out at a temperature equal to or above the melting point of calcium. According to another specific embodiment of the invention, the synthesis step can be carried out in a carbonaceous container.

According to yet another embodiment of the invention, a molding step can be placed between the mixing step and the synthesis step in which the resultant mixture from the mixing step is molded by compression.

The titanium carbonitride powder prepared from the present invention has a composition of about $TiC_{0.3}N_{0.7}$ to about $TiC_{0.7}N_{0.3}$, and a particle size range from about 10 nm to about 1 μm.

In yet another embodiment of the invention, the washed titanium carbonitride can be further treated with acid if need be.

Advantageous Effects of the Invention

The inventive method for preparing titanium carbonitride powder is highly economical as it utilizes abundantly available materials of titanium dioxide and calcium. The choice of calcium as the reductant in the inventive method supports homogeneous reaction by maintaining favorable mass distribution while allowing the synthetic reaction to be carried out in relatively low temperatures and a facile control of powder aggregation. Furthermore, the inventive method affords a simplified process in which carburization and nitrification proceed simultaneously and the side products are readily removed. According to the present invention, titanium carbonitride of uniform shapes and particle sizes can be prepared in a large scale.

DETAILED DESCRIPTION

The inventive method for preparing titanium carbonitride powder is explained in detail below. It should be noted beforehand that the interpretation of the terms and words used in the present specification and/or claims should not be limited to their conventional or dictionary meaning, but should be interpreted according to the principle that the inventor is entitled to be his own lexicographer for the purpose of defining his invention in the best way possible, in accordance with the technical idea of the present invention.

The first step of the present invention is a mixing step in which titanium dioxide ($TiO_2$), calcium (Ca) and carbon (C) are contacted under an inert atmosphere.

Both anatase and rutile crystal forms of titanium dioxide can be used as the starting material in the present invention, with the anatase form having a higher reactivity than the rutile form. In addition, it is preferred that titanium dioxide powder with the smallest particle size as possible is selected since this helps the product titanium carbonitride to achieve an ultrafine particle size. In consideration of economic factors and the particle size of titanium carbonitride, titanium dioxide powders with particle sizes of 10 nm-10 μm can be used in specific embodiments of the present invention.

In the inventive method for preparing titanium carbonitride, calcium acts as a reductant that reduces titanium dioxide and enables its reaction with carbon and nitrogen. In a specific embodiment, the mixing ratio of titanium dioxide to calcium is preferably from more than about 2 moles to about 6 moles or less of calcium per each mole of titanium dioxide. If calcium is present in less than about 2 moles, some of the titanium dioxide may remain unreacted. If more than about 6 moles of calcium is present, a local excess of calcium can form around titanium, and this leads to the formation of coarse particles of titanium carbonitride and coagulation of the powder produced, making it difficult to obtain a homogeneous powder.

In theory, 2 moles of calcium per each mole of titanium dioxide should be sufficient for the entire titanium dioxide to react, but in practice it is preferable to use calcium in excess of the theoretical amount since due to calcium's high reactivity, some of it will be lost to unwanted oxidation. Moreover, as the reactivity of calcium increases as its particle size decreases, handling of very fine grades can be cumbersome. Accordingly, in a specific embodiment of the present invention, calcium powder with somewhat larger particle size than that of $TiO_2$ is used.

Carbon is the source of the carbide moiety of titanium carbonitride of the present invention. In general, substances known as carbon sources in the field can be used without particular limitation. For instance, activated carbon and carbon black may be used. In a specific embodiment of the present invention, carbon black is used taking into account of the particle size of the titanium carbonitride produced.

In a specific embodiment, the mixing ratio of titanium dioxide to carbon is preferably from about 0.2 moles to about 2.5 moles of carbon per each mole of titanium dioxide. If carbon is present in less than about 0.2 moles, a large amount of the titanium dioxide may remain unreacted. If more than about 2.5 moles of carbon is present, nitrification at low temperatures becomes almost unobtainable.

In the present invention, it is advisable to avoid using very coarse grades carbon powder so that a homogeneous mixing of the reactants is achieved. Carbon powder with smaller particle size than that of the calcium can be suitably used.

The mixing step of the inventive method is carried out under an inert atmosphere to prevent calcium from being oxidized. For the inert atmosphere, it is sufficient that oxygen is purged out by means of inert gas such as nitrogen or argon. In a specific embodiment of the present invention, nitrogen is used as the inert atmosphere taking into account of the continuity between the mixing step and the ensuing synthesis step.

The mixing step can be either wet or dry. In a specific embodiment, dry mixing is used as it can be better in terms of preventing the oxidation of calcium.

The mixing time is not particularly limited as long as there is enough time for the starting materials to thoroughly mix, and a wide range of variations can be made to the mixing time in consideration of factors such as the particle sizes of the starting materials and the method of mixing. For example, the mixing can take place for, but is not limited to, from 10 minutes to 48 hours.

In the next step, the resultant mixture is heated under a nitrogen atmosphere to form titanium carbonitride (Ti(C, N)). This synthesis step forms titanium carbonitride by providing a reactive atmosphere for each starting material. The chemical reaction for forming titanium carbonitride is given below:

$$TiO_2 + xCa + C + N_2 \rightarrow TiC_yN_{1-y} + xCaO \qquad \text{[chemical formula]}$$

The heating is carried out at a suitable rate so that the temperature is raised up to a point at which the above reaction effectively proceeds. Then the reaction is allowed to proceed for a sufficient amount of time at this target temperature. The maximum target temperature can be preferably set at from about 600° C. to about 1500° C. to afford a high yield for titanium carbonitride.

In a specific embodiment of the present invention, the synthesis step is carried out at a temperature equal to or higher than the melting point of calcium; in other words, from calcium's melting point to about 1500° C. or below. If the reaction is run above the melting point of calcium, then calcium is present in a liquid state and the increased fluidity significantly improves mass distribution in the reaction system. The improved mass distribution in turn leads to homogeneous and spheroidized titanium carbonitride.

In another specific embodiment of the present invention, the synthesis step is carried out under a pressure of about 0.5 kgf/cm$^2$ to about 10 kgf/cm$^2$ The container for the reaction mixture during the synthesis step is not particularly limited provided it is made out of a material capable of withstanding the reaction temperature. In a specific embodiment, carbonaceous containers are used to avoid contamination of the powder from local reactions induced by the heat of the reaction as may be seen in glass or ceramic containers.

The reaction mixture can be compression molded after the mixing step but before entering the synthesis step, if necessary. Compression molding of the reaction mixture raises the reaction efficiency by expanding the contact area of the particles.

Following the synthesis step, the washing step is carried out in which the reaction mixture is washed with water to remove calcium oxide (CaO) from the titanium carbonitride present in the reaction products. Calcium oxide is formed as a byproduct of the reaction in the present invention. Since calcium oxide readily dissolves in water, a simple washing step with water is able to remove it. Accordingly, the present invention is capable of providing high purity titanium carbonitride with ease due to its simple and facile byproduct removal as explained above.

The inventive method can further comprise the step of acid treating the titanium carbonitride washed with water. Minute quantities of impurities present after washing with water can be removed with such acids as sulfuric acid, nitric acid, hydrochloric acid and acetic acid to afford a high purity titanium carbonitride product.

In an embodiment of the present invention, the titanium carbonitride prepared has a composition of about $TiC_{0.3}N_{0.7}$ to about $TiC_{0.7}N_{0.3}$ (within this range, the sum of the coefficients for C and N is one). In a more specific embodiment of the present invention, titanium carbonitride powder having a composition of $TiC_{0.3}N_{0.7}$, $TiC_{0.5}N_{0.5}$ and/or $TiC_{0.7}N_{0.3}$ is available.

The particle size of the titanium carbonitride powder prepared according to the present invention as set forth above ranges from about 10 nm to about 1 µm, more specifically from about 10 nm to about 600 nm, and still more specifically from about 100 nm to about 500 nm.

Certain embodiments of the invention are illustrated by the following non-limiting examples.

Example 1

1 mole of powdered anatase $TiO_2$ (particle size 0.1 µm), 3 moles of powdered calcium (particle size 2 mm) and 0.5 moles of powdered carbon (carbon black, particle size 10 µm) were provided, with each material having a purity of at least 99%. All materials were mixed dry for 3 hours under a nitrogen-filled atmosphere to prevent the oxidation of calcium during mixing.

After the mixing was over, the reaction mixture was compression molded with a press under a pressure of at least 1000 kgf/mm$^2$, and the molded mixture was moved into an electric furnace via a carbonaceous crucible. In advance of heating this mixture in the electric furnace, vacuum was applied and a flow of nitrogen gas was let in, with the nitrogen pressure maintained at 1.5 kgf/cm$^2$ throughout the experiment. The heating rate of the electrical furnace was 5° C./min with the peak temperature set at 880° C.

The reaction mixture was allowed to react for an hour at the peak temperature and when the reaction was over, the reaction products were washed five times with distilled water. The washed mixture underwent the final impurity removal step with dilute hydrochloric acid (6 N, 1.5 L) to remove last traces of moisture. The product powder thus obtained was found to be pure titanium carbonitride as determined by X-ray diffraction (XRD) and field emission scanning electron microscopy (FE-SEM) analysis and had the composition of $TiC_{0.7}N_{0.3}$ with a particle size of 500 nm or less.

Example 2

1 mole of powdered rutile $TiO_2$ (particle size 0.2 µm), 3 moles of powdered calcium (particle size 2 mm) and 0.65 moles of powdered carbon (carbon black, particle size 10 µm) were provided.

The same procedure as Example 1 was repeated except for the fact that the nitrogen pressure was instead kept at 2.0 kgf/cm$^2$ to prepare powdered titanium carbonitride. The resultant powder was found to be pure titanium carbonitride as determined by XRD and FE-SEM analysis and had the composition of $TiC_{0.7}N_{0.3}$ with a particle size of 600 nm or less.

Figure 1:
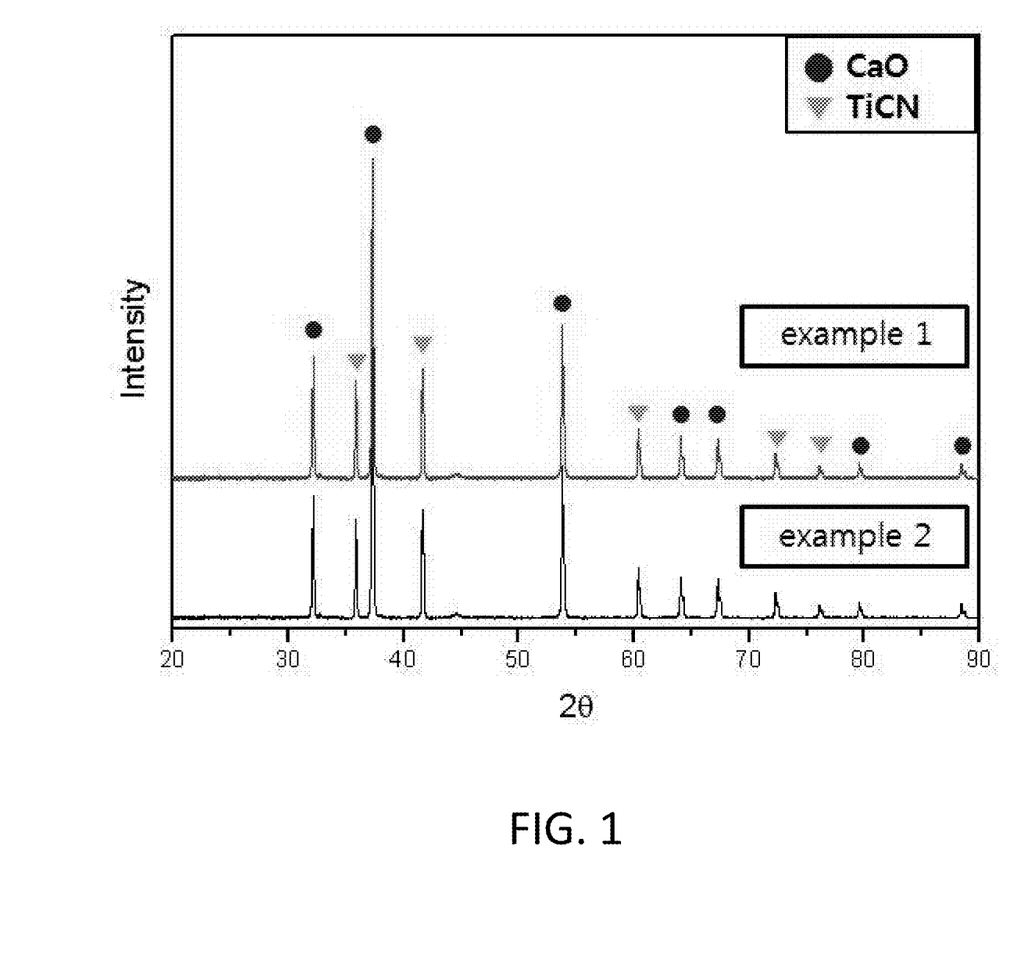
FIG. 1 shows an X-ray diffractogram confirming the presence of titanium carbonitride powder and CaO, a byproduct in the reaction products according to an embodiment of the present invention. The reaction products were analyzed with X-ray diffraction before washing with water.
Figure 2A:
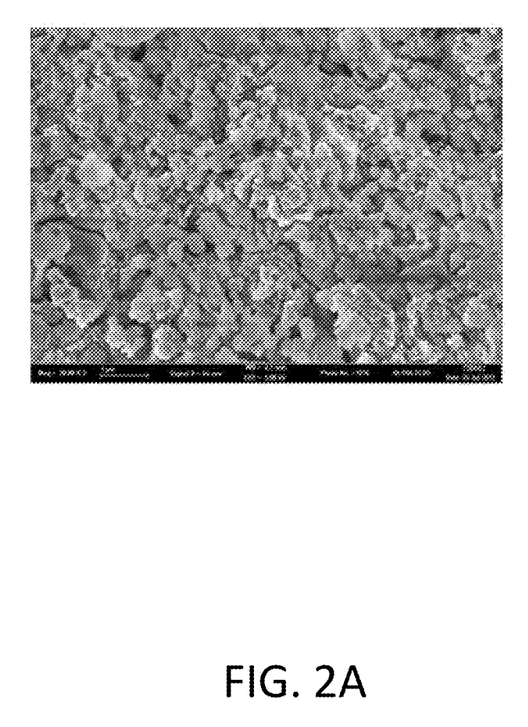
FIGS. 2a and 2b are field emission scanning electron microscopy (FE-SEM) photographs of the same unwashed reaction products as FIG. 1.
Figure 2B:
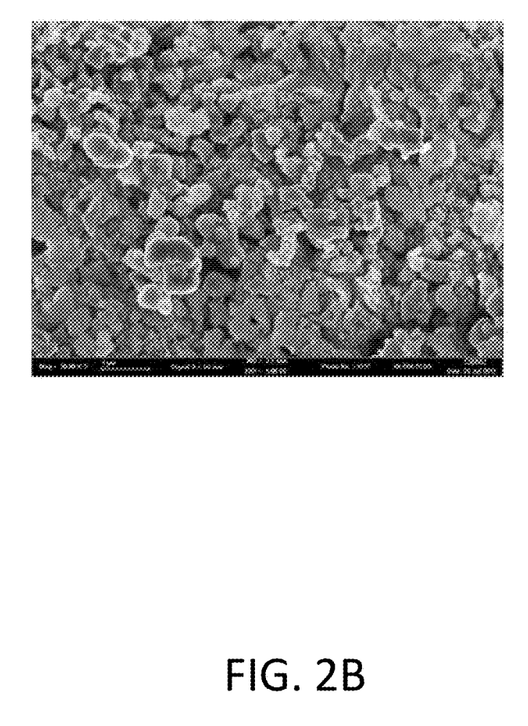

For reference, the X-ray diffractogram and FE-SEM photographs for the powder produced that did not undergo washing with water and in mixture with calcium oxide from Examples 1 and 2 are presented in FIGS. 1, 2a (Example 1) and 2b (Example 2), respectively.

Figure 3:
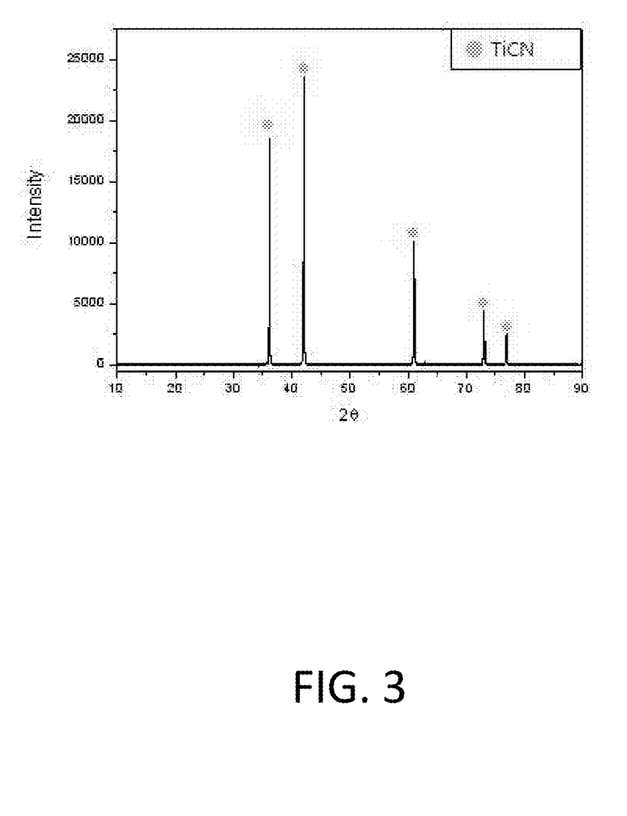
FIG. 3 is shows an X-ray diffractogram of the titanium carbonitride powder according to an embodiment of the present invention. The X-ray analysis was conducted for the reaction products washed with water.
Figure 4:
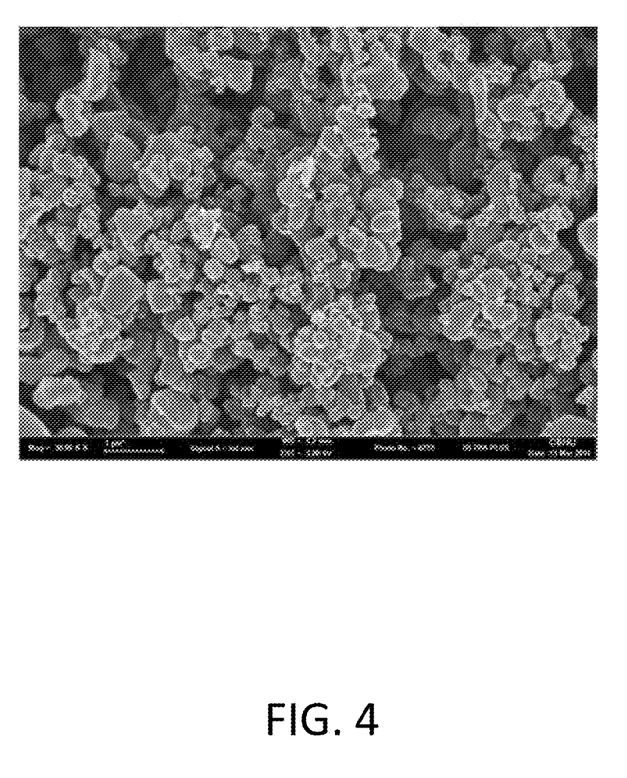
FIG. 4 is an FE-SEM photograph of the titanium carbonitride powder according to the same embodiment as FIG. 3. The photograph was taken after washing the reaction products with water.

FIGS. 3 and 4 respectively represent the X-ray diffractogram and FE-SEM photograph for the titanium carbonitride powder washed with water prepared according to Example 1. The results show the high purity (FIG. 3) and uniform spheroidized shape (FIG. 4) of the titanium carbonitride prepared according to the inventive method.

Although the foregoing invention has been described in some detail by way of specific embodiments and drawings, by no means is the present invention limited thereto. Those skilled in the art may recognize various changes, modifications and other equivalents to the specific embodiments described herein without departing from the technical idea or the claims attached hereto.

What is claimed is:

1. A method for preparing titanium carbonitride powder, the method comprising the steps of:
   a mixing step for contacting titanium dioxide ($TiO_2$), calcium (Ca) and carbon (C) under an inert atmosphere, the carbon being activated carbon, carbon black, or both;
   a synthesis step for reacting the resultant mixture from the mixing step by heating under a nitrogen atmosphere under a pressure of about 0.5 kgf/cm$^2$ to about 10 kgf/cm$^2$ at a temperature of about 600-1500° C. or lower; and
   a washing step for removing calcium oxide (CaO) by washing the mixture with water after the completion of the synthesis step.

2. The method of claim 1, wherein the mixing ratio between titanium dioxide and calcium is from more than about 2 moles to about 6 moles or less of calcium per each mole of titanium dioxide.

3. The method of claim 1, wherein the mixing ratio between titanium dioxide and carbon is about 0.2-2.5 moles of carbon per each mole of titanium dioxide.

4. The method of claim 1, wherein the mixing step is carried out as a dry mixing.

5. The method of claim 1, wherein the synthesis step is carried out at a temperature equal to or higher than the melting point of calcium.

6. The method of claim 1, wherein the synthesis step is carried out in a carbonaceous container.

7. The method of claim 1, wherein the method further comprises a molding step between the mixing step and the synthesis step wherein the resultant mixture from the mixing step is molded by compression.

8. The method of claim 1, wherein the composition of the titanium carbonitride prepared is from about $TiC_{0.3}N_{0.7}$ to about $TiC_{0.7}N_{0.3}$, provided that the sum of the stoichiometric coefficients for carbon and nitrogen in the titanium carbonitride is one.

9. The method of claim 1, wherein the particle size of the prepared titanium carbonitride powder ranges from about 10 nm to about 1 µm.

10. The method of claim 1, further comprising acid treating after the washing step the titanium carbonitride washed with water.

* * * * *